(12) United States Patent
Halvorson et al.

(10) Patent No.: US 8,543,258 B2
(45) Date of Patent: Sep. 24, 2013

(54) VALUATION AND SIMULATION OF REQUIRED NAVIGATION PERFORMANCE

(75) Inventors: James O. Halvorson, University Place, WA (US); William H. Syblon, Renton, WA (US)

(73) Assignee: The Boeing Company, Chicago, IL (US)

( * ) Notice: Subject to any disclaimer, the term of this patent is extended or adjusted under 35 U.S.C. 154(b) by 1469 days.

(21) Appl. No.: 11/924,815

(22) Filed: Oct. 26, 2007

(65) Prior Publication Data

US 2009/0112539 A1    Apr. 30, 2009

(51) Int. Cl.
*G06G 7/72*    (2006.01)
(52) U.S. Cl.
USPC .............................. 701/3; 701/120; 701/121
(58) Field of Classification Search
USPC ..... 701/120, 3, 465, 301, 121, 204; 700/213; 702/6, 8
See application file for complete search history.

(56) References Cited

U.S. PATENT DOCUMENTS

| | | | |
|---|---|---|---|
| 6,234,799 B1 | 5/2001 | Lin | |
| 6,298,318 B1 | 10/2001 | Lin | |
| 6,684,182 B1 * | 1/2004 | Gold et al. | 703/8 |
| 7,113,852 B2 | 9/2006 | Kapadia et al. | |
| 7,188,059 B2 | 3/2007 | White et al. | |
| 7,239,311 B2 | 7/2007 | Dunn et al. | |
| 7,256,730 B2 | 8/2007 | Hernandez-Pajares et al. | |
| 2006/0095156 A1 * | 5/2006 | Baiada et al. | 700/213 |
| 2007/0239348 A1 * | 10/2007 | Cheung | 701/200 |

OTHER PUBLICATIONS

Mayer, Ralf H.; Estimating Operational Benefits of Aircraft Navigation and Air Traffic Control Procedures Using an Integrated Aviation Modeling and Evaluation Platform Proceedings of the 2006 Winter Simulation Conference, (Dec. 3-6, 2006).*

* cited by examiner

*Primary Examiner* — Thomas Tarcza
*Assistant Examiner* — Adam Tissot
(74) *Attorney, Agent, or Firm* — Armstrong Teasdale LLP

(57) ABSTRACT

A method for illustrating potential benefits resulting from revised navigation procedures to a customer is described. The method includes preparing a model for a revised navigation procedure, determining a landing probability for both an existing minimum separation procedure and a minimum separation determined utilizing the revised navigation procedure, calculating a benefit associated with a difference in the landing probabilities, and validating the revised navigation procedures through demonstration and use of the revised navigation procedure model on a computer-based flight simulation program.

14 Claims, 5 Drawing Sheets

VALUATION AND SIMULATION OF REQUIRED NAVIGATION PERFORMANCE

BACKGROUND OF THE INVENTION

This invention relates generally to operation of aircraft, and more specifically, to valuation and simulation of required navigation performance (RNP).

One issue associated with the operation of aircraft, or more specifically, proposed changes to the operation of aircraft, is the demonstration how changes or revisions to approach procedures, which are sometimes referred to herein as required navigation performance (RNP), can reduce operating costs or provide other benefits to an aircraft operator. One existing demonstration procedure is to take one or more proposed RNP procedures and fly them in a test environment which consists of either a full motion simulator or a fully configured test/bench mirroring the airplane. However, to see demonstrations of such procedures in the test environment, customers must travel to set locations for the demonstration as simulators and test benches are typically not easily portable.

As will be understood, the above approach is relatively high in cost. For example, the average cost of an hour of simulator time with an operator is estimated to be about $800 per hour, and typically sold in blocks of four hours. Additionally customers may have to travel to a simulator location, which has an associated cost. Adding the two costs together results in a fairly expensive demonstration cost for a proposed RNP procedure.

BRIEF DESCRIPTION OF THE INVENTION

In one aspect, a method for illustrating potential benefits resulting from revised navigation procedures to a customer is provided. The method includes preparing a model for a revised navigation procedure, determining a landing probability for both an existing approach procedure for the published landing minimum and a proposed approach procedure utilizing the revised navigation procedure model, the procedure model including a revised landing minimum, calculating a benefit associated with a difference in the landing probabilities, and validating the revised navigation procedures through demonstration and use of the revised navigation procedure model on a computer-based flight simulation program accessible by multiple users.

In another aspect, a computer system for valuation and simulation of flight procedures is provided. The computer system includes at least one database comprising data relating to flight operations and customer airline operation, a modeling program, the modeling program configured to build an aerospace value model from the database data, a software program configured to utilize the aerospace value model to generate at least one revised navigation procedure, and at least one cost savings item associated with the revised navigation procedure, a flight simulation program operable to demonstrate the revised navigation procedure for illustration of the at least one cost savings item, and a user interface configured to display outputs of the flight simulation program.

DETAILED DESCRIPTION OF THE INVENTION

Figure 1:
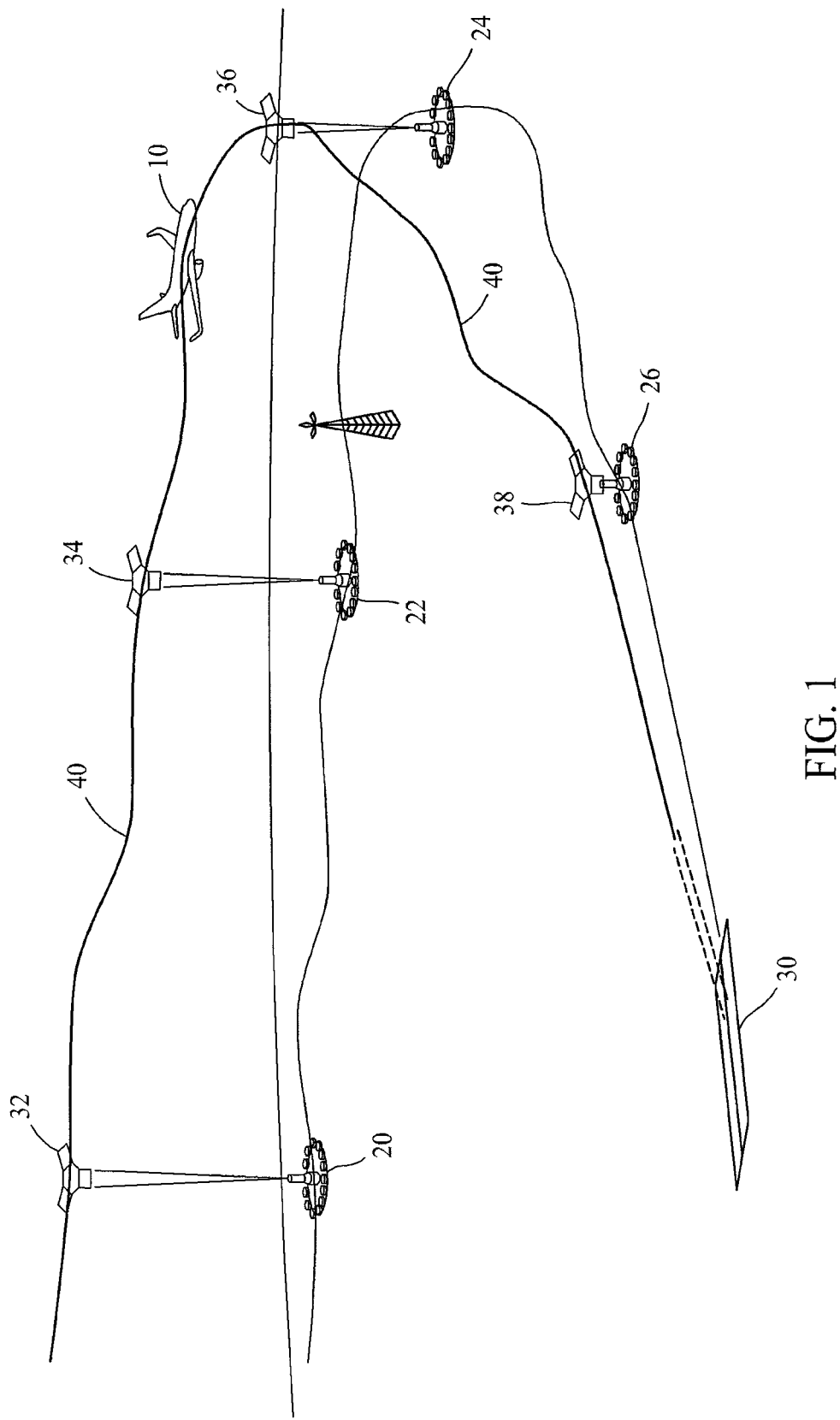
FIG. 1 is a diagram illustrating a runway approach for an aircraft based on ground-based navigation.

FIG. 1 is a diagram illustrating a runway approach for an aircraft 10 based on ground-based navigation. The ground-based navigation includes a plurality of ground-based transmitters 20, 22, 24, and 26 which are utilized to guide the aircraft 10 to the runway 30. More specifically, aircraft 10 is positioned by a pilot on a predetermined flight path or automatic flight system such that it receives the strongest possible signal from each of the transmitters 20, 22, 24, and 26. Typically, the strongest signal is directly above the transmitters 20, 22, 24, and 26, as is illustrated by the individual signal patterns 32, 34, 36, and 38 respectively. When the aircraft is to the side of a transmitter, transmitter 22 for example, the aircraft 10 includes equipment that indicates that the aircraft flight path needs to be adjusted to starboard or port, in order to get to the desired approach path 40, directly above the transmitters 20, 22, 24, and 26. It should be noted that approach path 40 includes altitude adjustments as the aircraft 10 approaches each individual transmitter 20, 22, 24, and 26, in order to receive the optimum signal from that individual transmitter. One purpose of such a system is to provide a minimum separation between the aircraft and known obstacles to flight, for example, a very tall building or a mountain near an airport. The minimum separation is sometimes referred to in aircraft related industries as required separation or minima.

Figure 2:
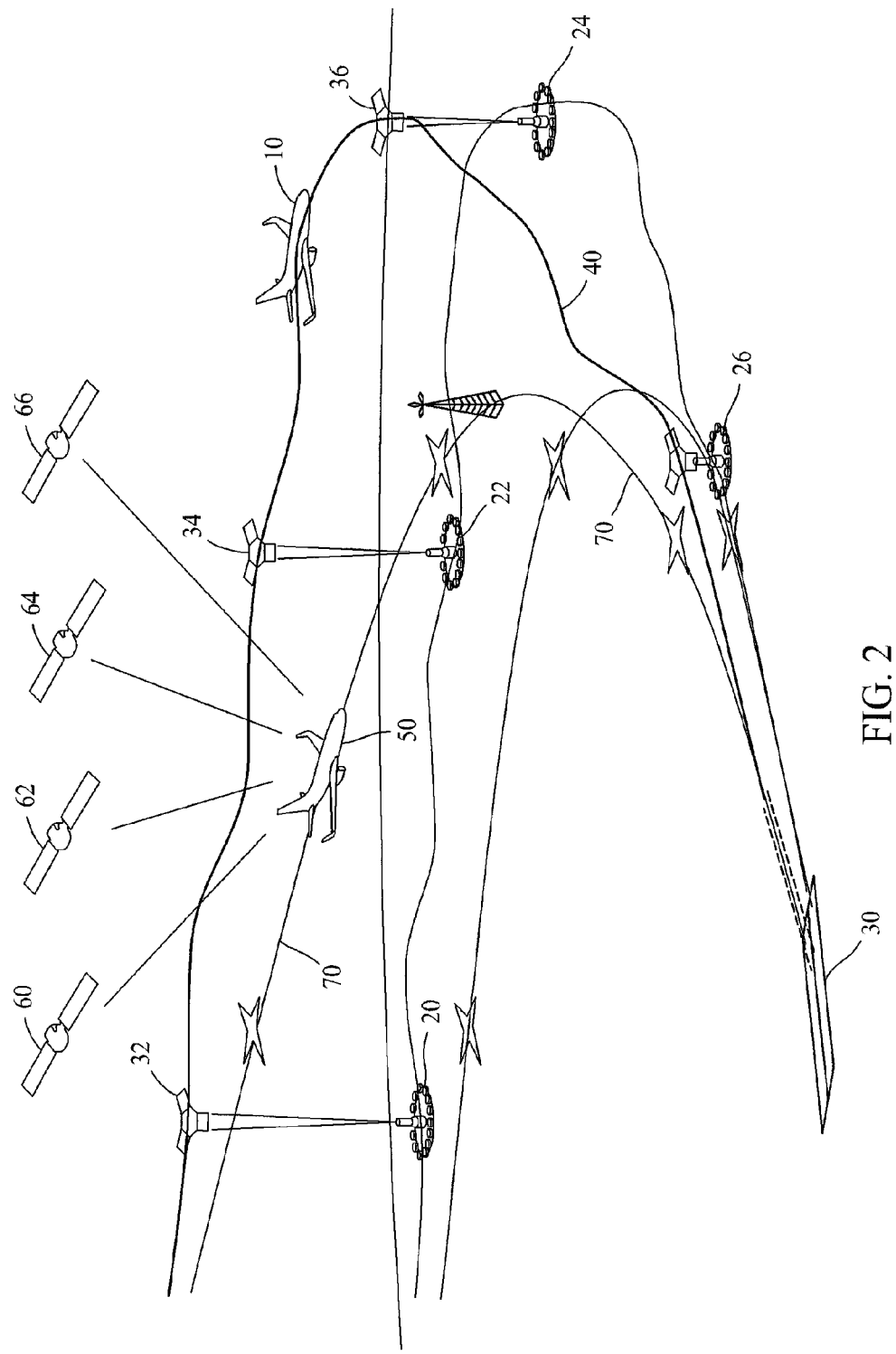
FIG. 2 is an illustration of a runaway approach that has been modified from that of FIG. 1 based on required navigation performance.

FIG. 2 is an illustration of a runaway approach that has been modified from that of FIG. 1 based on required navigation performance (RNP). RNP is a highly flexible method of revising navigation procedures for navigating an aircraft 50 in the airspace system. In one embodiment, RNP is utilized to move responsibility of obstacle and/or other airplane separation from air traffic control (ATC) and ground based systems and assign the responsibility for separation (e.g., maintaining a minima) to a system within the aircraft 50, for example, a navigation system. The result includes increased operational efficiencies and increased safety.

Referring again to FIG. 2, by relying on the navigation system within the aircraft 50, working in conjunction with several satellites 60, 62, 64, and 66, the approach 70 to runway 30 can be shortened over the also illustrated ground-based navigation approach. In at least one embodiment, the satellites 60, 62, 64, and 66 are part of a GPS system and the navigation system within the aircraft 50 includes a GPS receiver. The shortened approach 70 reduces fuel consumption, which is obviously a costs savings, and may reduce overall flight times, which is pleasing to air travelers.

With respect to the above, area navigation (RNAV) is a method of navigation that permits aircraft operation on any desired course within the coverage of station-referenced navigation signals. One example of a station-referenced navigation signal source is a global positioning system (GPS). Therefore an aircraft can be operated within the limits of a self contained system capability, or a combination of the GPS and the self contained system.

Required navigation performance is a statement of the navigation performance necessary for operation within a defined airspace, and includes a defined separation. More specifically, RNP is a method of implementing routes and flight paths that differs from previous methods and which includes calculation of separation at least partially based on the capabilities of the systems onboard a representative aircraft. The implementation differs in that not only does RNP have an associated performance specification that an aircraft must meet before the path can be flown, but the achieved performance is also monitored. In one embodiment, an alert is provided in the event that the implementation fails to meet the specification. It is the monitoring and alerting capabilities that distinguish RNP from RNAV, from which RNP was developed. As further described herein, RNP equipped aircraft can safely operate routes with less separation (minima) than previously required. The reduction in separation requirements is significant because it increases the number of aircraft that can safely use a particular airspace and therefore accommodate the increasing demand for air traffic capacity. RNP further allows continuous descent approaches and provides a lower landing minima.

Figure 3:
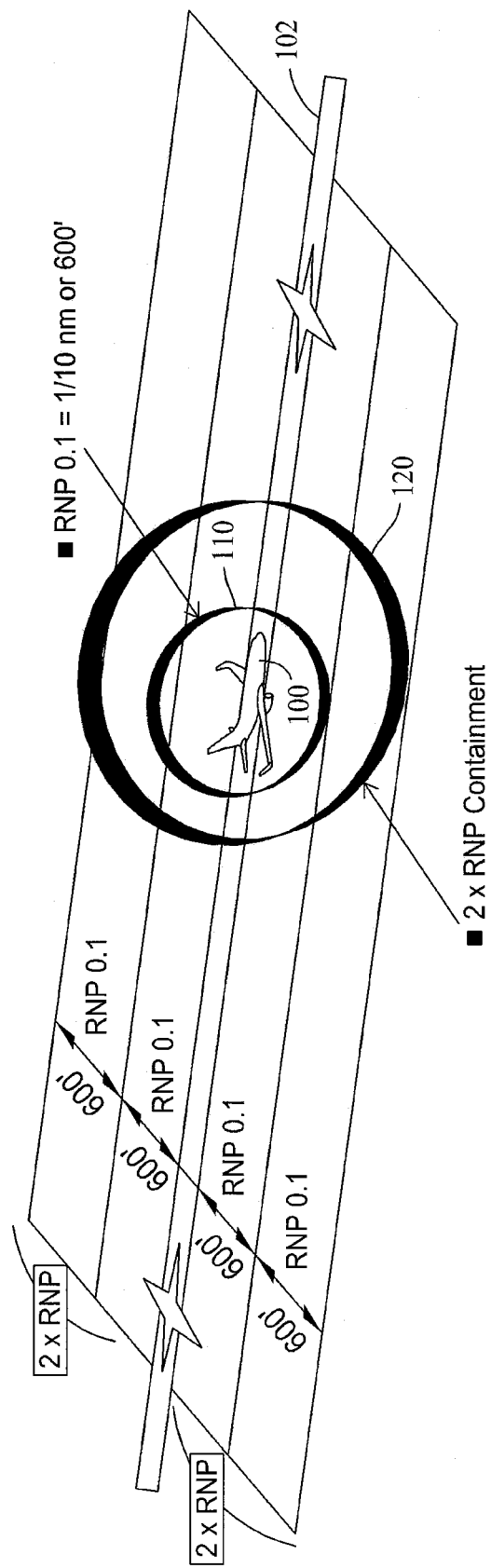
FIG. 3 illustrates a required navigation performance area associated with a specific aircraft configuration.

FIG. 3 illustrates the required navigation performance (RNP) concept from a perspective of aircraft 100 and a desired flight path 102. RNP refers to a specific level of positional accuracy, integrity and continuity supporting airplane navigation systems to allow a defined operation in the airspace, and is an operational concept. In FIG. 3 the RNP is measured in nautical miles (nm), and the aircraft 100 has an RNP 110 of 0.1 nm, which is about 600 feet, based on, for example, the navigation system used therein. Through utilization of a 2×RNP containment area 120, the aircraft 100 is provided with an ability to navigate and avoid obstacles, based on for example, GPS navigation.

Herein described are methods of valuation and simulation of required navigation performance (RNP) which enable RNP procedure valuation and demonstration on a desktop without requiring a time and capital intensive full flight simulator. Generally, these processes calculate the dollar benefits of RNP procedures and provide a customer experience to validate the benefits by enabling the use and visualization of technology. More specifically, by linking value analysis with visualization and simulation, a business case can be validated. Additionally, and as further described below, a value analysis is determined by utilizing multiple data sets, including one or more of, but not limited to, Jeppesen charts, official airline guide (OAG) schedules, navigation databases, and weather data.

Figure 4:
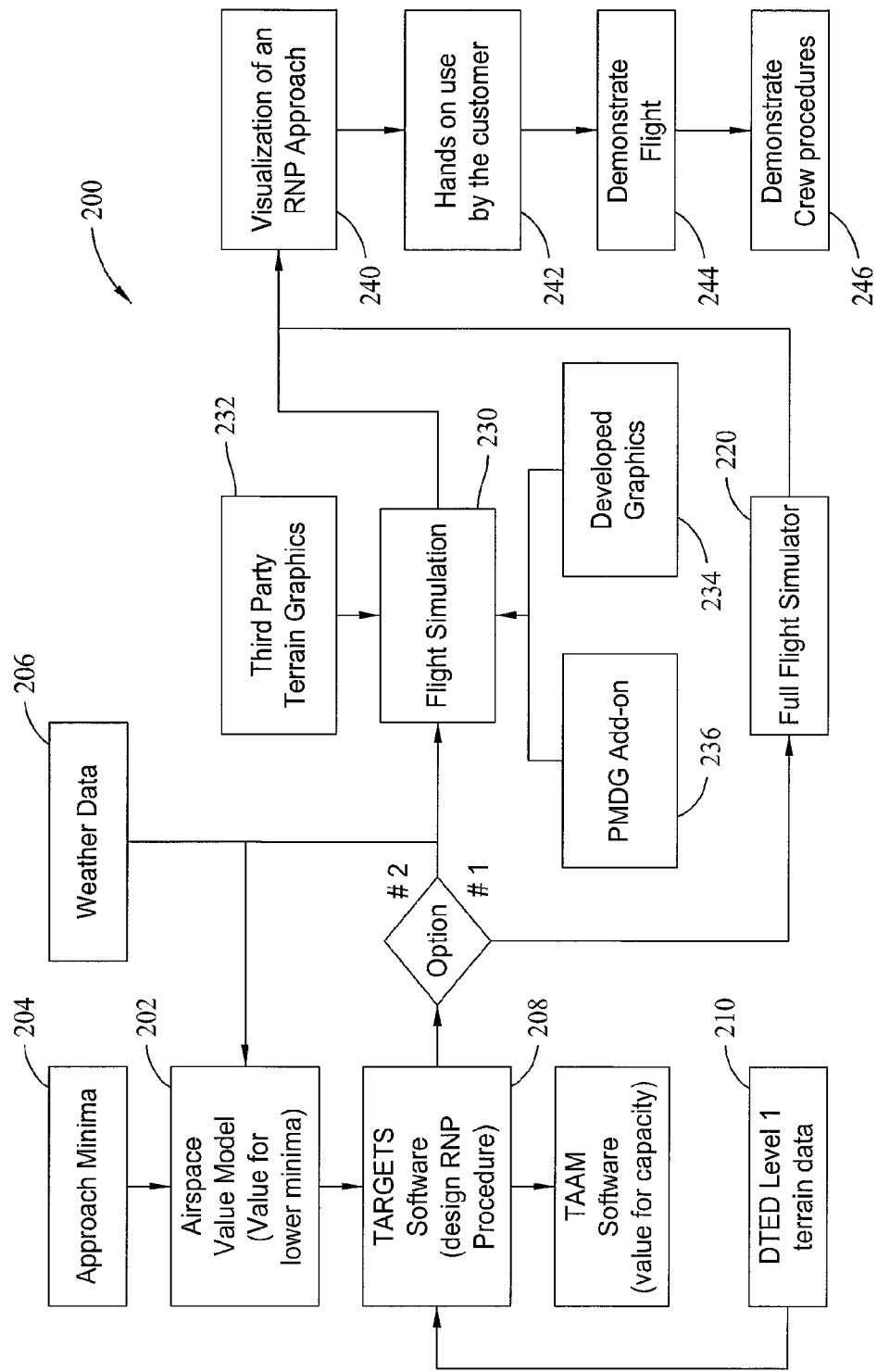
FIG. 4 is a flowchart that illustrates development of revised navigation procedures and the illustration of the revised navigation procedures through a computer-based flight simulation program.

FIG. 4 is a flowchart 200 that illustrates inputs to modeling procedures that are utilized in the development of revised navigation procedures and the illustration of potential benefits resulting from the developed revised navigation procedures, for example, to a customer.

More specifically, an aerospace value model is developed 202 from data sets relating to flight operations and customer data sets, with a goal of reducing minima, for example used in calculating an approach path for an aircraft. Multiple datasets can be utilized to build an aerospace data set, and the examples illustrated in FIG. 4 include, published approach minima 204 and weather data 206. The published approach minima may sometimes be referred to as Jeppesen charts. Other data sets that might be utilized include official airline guide (OAG) schedules, and navigation databases.

Once the model is developed 202, a revised navigation procedure is calculated, or designed 208, using, in one embodiment, a terminal area route generation and traffic simulation (TARGETS) tool along with the model. Navigation databases, for example, a digital terrain elevation database 210 may be utilized in the design of the revised navigation procedure. Utilization of specific airline requirements may also occur in the design of the revised navigation procedure.

In an embodiment, after a revised navigation procedure is designed 208, a total airspace and airport modeling (TAAM) program is utilized to calculate 212 additional airport capacity improvements that result from the revised navigation procedure.

Up until the embodiments described herein, validation of a revised navigation procedure included simulation of the revised navigation procedure in a full flight simulator 220. The drawbacks to such an approach are described elsewhere herein.

Referring again to FIG. 4, an alternative approach is to validate the revised navigation procedure through demonstration and use of the revised navigation procedures on a computer-based flight simulation program 230. To accurately portray the revised navigation procedures with the flight simulation program, in one embodiment, it is modified to include data such as, third party terrain graphics 232, user developed graphics 234, and any other aircraft operation add on data 236, for example, but not limited to, airline specific data.

The flight simulation program 230, along with the modifications described above, is operable for a user to visualize 240, for example, an approach to a runway as it would occur based on the revised navigation procedure. Such a simulation provides hands on use by a customer 242, demonstration of the flight 244, and demonstration of crew procedures 246, to experience changes in crew workload. Examples of items that might cause a customer to adopt such a revised navigation procedure include any time and/or fuel savings associated with the revised navigation procedures and airport capacity improvements. Such capacity improvements would typically be a function of the existing airport arrival and departure schedule and simulated with before and after approaches to measure time and capacity improvements.

Based on the data from the computer-based flight simulation program, a value analysis can be generated, based on any or all of the time savings, fuel savings, and capacity improvements. The value analysis, coupled with customer data results in a value for lower minima, and tools exist for designing additional RNP procedures that further enable time and fuel savings. These additional procedures can also be used to calculate additional airport capacity improvements utilizing the proposed revised navigation procedure. Capacity improvements are a function of the existing airport arrival and departure schedule, from the OAG, simulated with before and after revised navigation procedure approaches to measure time and capacity improvements.

Figure 5:
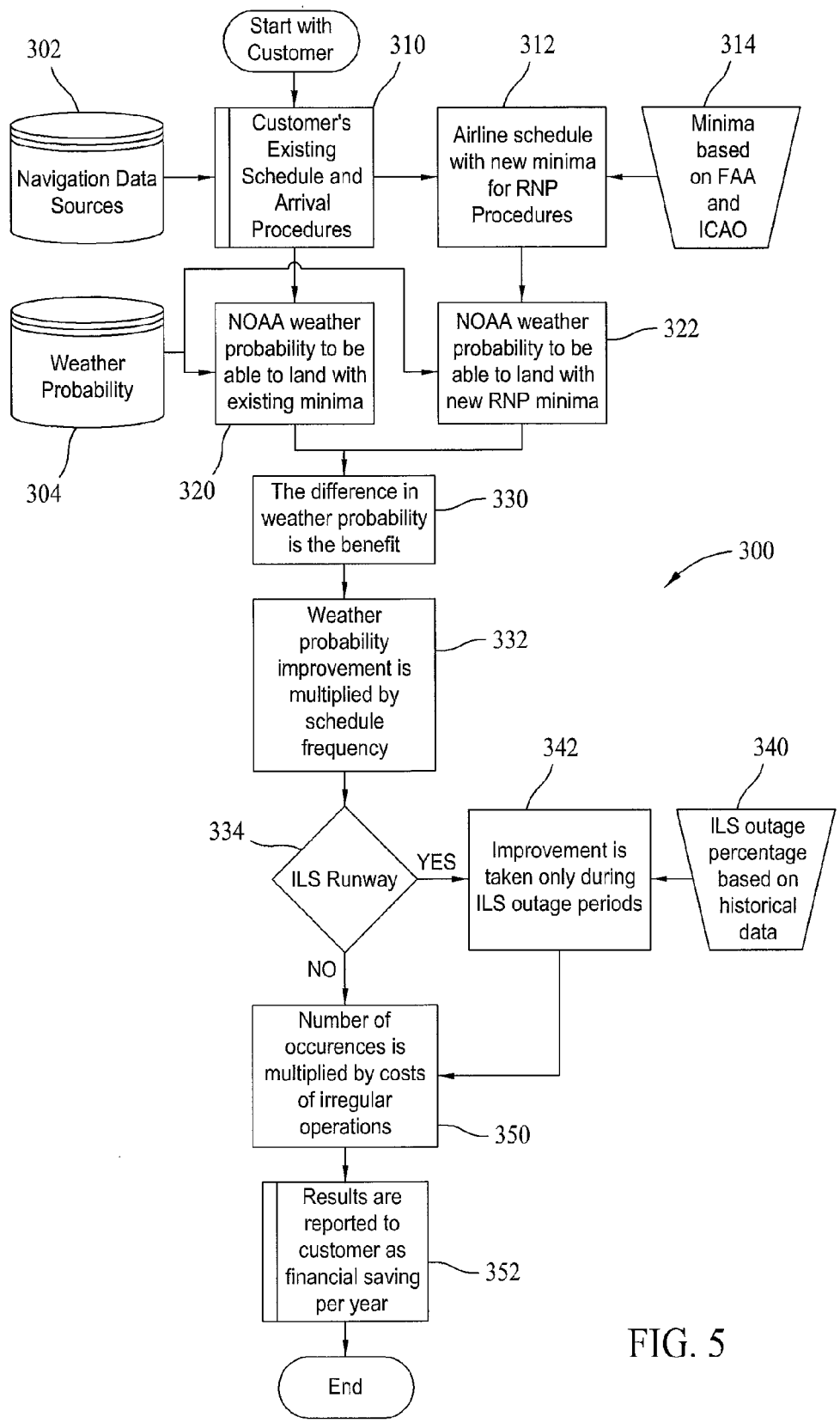
FIG. 5 is a flowchart that illustrates a calculation of benefits resulting from incorporation of revised navigation procedures.

FIG. 5 is a flowchart 300 that illustrates a calculation of benefits resulting from incorporation of revised navigation procedures, and provides further detail regarding generation of the aerospace value model 202 of FIG. 4. Certain data is utilized in the calculation of benefits of an RNP implementation, including navigation data sources 302 and a weather probability database 304. To determine the benefits, the customer's (e.g., the airline's) existing schedule and arrival procedures are received 310 and an airline schedule that includes new minima for RNP procedures is developed 312. Development of the new airline schedule takes into account minima 314 that are based on Federal Aviation Administration and International Civil Aviation Organization guidelines.

Utilizing the weather probability database 304, a probability to land with existing minima is calculated 320 and a probability to land with the RNP procedure is calculated 322. The difference between the two calculated probabilities is representative of the benefit provided 330 by implementation of the RNP procedures. The weather probability improvement is then multiplied 332 by schedule frequency and it is then determined 334 if the runway is an instrument landing system (ILS) equipped runway.

If the runway is ILS equipped, a percentage of ILS outages is retrieved 340 from historical data and the benefit from RNP procedures is applied 342 only to the ILS outage periods. Then for both ILS and non-ILS equipped runways, the number of occurrences (e.g., the number of landings without ILS) is multiplied 350 by costs of irregular landing operations, for example, delays, cancellations and diversions, and the results of the multiplication are reported 352 to the customer as a financial savings, for example, on an annual basis.

As described above, the computer-based flight simulation program enables a customer to fly a new revised navigation procedure thereby experiencing the changes in crew workload and visualizing the how the approach would be flown without requiring a full-flight simulator demonstration. Integration of the revised navigation procedure solution and analysis is utilized to illustrate the value of the new revised navigation procedure utilizing a visualization that provides a more complete customer experience, validates our value analysis, and creates a market preference for such products.

Valuation and simulation of RNP procedures on a desktop computer flight simulator enhances marketing and sales toolset for new aircraft sales as well as retrofit sales campaigns. By linking the RNP process with the flight simulator rather than the utilization of a full flight simulator offers considerable cost savings, and allows more people within a customer's organization to experience the simulation of the proposed RNP procedures.

The simulation of RNP procedures, for example, utilizing a desktop computer, provides easy validation of assumptions used in the above mentioned valuation models, for example, minima assumptions and track definition. The desktop simulation further demonstrates the capability of one or more specific aircraft to fly according to the RNP procedures, for example, relative to obstacle avoidance.

Further, the simulation of RNP procedures utilizing a desktop computer provides an easy demonstration of crew procedures. When flying an RNP procedure, defined paths that are easily repeatable are provided. More specifically, the simulation illustrates to the pilots how the autopilot system is engaged with lateral and vertical navigation as well as demonstrating speed and altitude intervention associated with the flight management computer.

The desktop computer simulation of an RNP procedure, when fully engaged, visually illustrates how obstacles are avoided on the RNP flight path. The illustration is provided from both the pilots prospective as well as from outside the airplane. Demonstration of obstacle avoidance also illustrates safety benefits associated with the RNP procedure as compared to other procedures. Finally, a major benefit of the RNP procedures described herein is enabling the airplane to land in lower visibility conditions. The desk top computer based simulation of RNP procedures, as indicated above, includes a capability for addition of weather simulation components. This capability provides for the demonstration of RNP procedures being flown in inclement weather, through the desktop simulation.

While the invention has been described in terms of various specific embodiments, those skilled in the art will recognize that the invention can be practiced with modification within the spirit and scope of the claims.

What is claimed is:

1. A computer system for valuation and simulation of revised navigation procedures, said computer system comprising:
   at least one database comprising required navigation performance data relating to flight operations and customer airline operation;
   a modeling program, said modeling program configured to build an aerospace value model from said at least one database of required navigation performance data;
   a software program configured to:
      utilize the aerospace value model to generate at least one revised navigation procedure, and at least one cost savings item associated with the revised navigation procedure; and
      monitor the revised navigation procedure and to alert deviation of the revised navigation procedure from the required navigation performance data;
   a flight simulation program operable to demonstrate the revised navigation procedure for illustration of the at least one cost savings item; and
   a user interface configured to display outputs of said flight simulation program.

2. A computer system according to claim 1 wherein said user interface is operable to adjust said software program for specific airline requirements.

3. A computer system according to claim 1 wherein the flight operations include at least one of aircraft takeoff, aircraft landing, and airport throughput.

4. A computer system according to claim 1 wherein said database of required navigation performance data comprises at least one of published minima, published charts, official airline guide (OAG) schedules, navigation databases, and weather data.

5. A computer system according to claim 1 wherein said modeling program is configured to couple required navigation performance data relating to flight operations with customer airline operation data to calculate a minima value.

6. A computer system according to claim 1 wherein said software program is configured to utilize a terminal area route generation and traffic simulation tool to design the at least one revised navigation procedure.

7. A computer system according to claim 6 wherein to determine the at least one cost savings item associated with the revised navigation procedures, said software program is configured to determine at least one of a time and fuel savings associated with the at least one revised navigation procedure.

8. A computer system according to claim 1 wherein said software program is configured to utilize the at least one revised navigation procedure in a total airspace and airport modeling program to calculate additional airport capacity improvements that result from the at least one revised navigation procedure.

9. A computer system according to claim 8 where the capacity improvements are a function of the existing airport arrival and departure schedule and simulated with before and after approaches to measure time and capacity improvements.

10. A computer system according to claim 1 wherein said flight simulation program is operable by a user, through said user interface, to determine and experience changes in crew workload due to the at least one revised navigation procedure.

11. A computer system according to claim 1 wherein said software program is configured to:
   determine a landing probability for both an existing minimum separation procedure and a minimum separation determined utilizing the revised navigation procedure; and calculate the at least one cost savings based on a probability improvement, the probability improvement being a difference in the landing probabilities.

12. A computer system according to claim 11 wherein said software program is configured to:
  multiply the probability improvement by a frequency of scheduled landings; and
  multiply the cost of an irregular landing operation with a number of anticipated irregular landing operations for a given time period based on the landing probability utilizing the revised navigation procedure; and
  generate a report of cost savings resulting from an implementation of the revised navigation procedure.

13. A computer system according to claim 12 wherein said software program is configured to multiply the product of the probability improvement and frequency of scheduled landings by an outage percentage for an instrument landing system.

14. A computer system for valuation and simulation of revised navigation procedures, said computer system comprising:
  at least one database comprising required navigation performance data relating to flight operations and customer airline operation;
  a modeling program, said modeling program configured to build an aerospace value model from said at least one database of required navigation performance data;
  a software program configured to:
    utilize the aerospace value model to generate at least one revised navigation procedure, and at least one cost savings item associated with the revised navigation procedure;
    determine a landing probability for both an existing minimum separation procedure and a minimum separation determined utilizing the revised navigation procedure; and
    calculate the at least one cost savings based on a probability improvement, the probability improvement being a difference in the landing probabilities;
  a flight simulation program operable to demonstrate the revised navigation procedure for illustration of the at least one cost savings item; and
  a user interface configured to display outputs of said flight simulation program.

* * * * *